United States Patent [19]

Hodes et al.

[11] Patent Number: 4,562,122
[45] Date of Patent: Dec. 31, 1985

[54] MULTI-LAYER PLAIN BEARING

[75] Inventors: Erich Hodes, Rosbach; Peter Lippok, Wiesbaden-Biebrich; Bernd Miotk, Mainz-Kostheim, all of Fed. Rep. of Germany

[73] Assignee: Glyco-Metall-Werke, Daelen & Loos GmbH, Wiesbaden, Fed. Rep. of Germany

[21] Appl. No.: 579,850

[22] Filed: Feb. 13, 1984

[30] Foreign Application Priority Data

Feb. 11, 1983 [DE] Fed. Rep. of Germany ....... 3304740

[51] Int. Cl.$^4$ .............................................. B32B 15/00
[52] U.S. Cl. ..................................... 428/644; 428/643; 428/645; 428/646; 428/647; 308/DIG. 8
[58] Field of Search ................. 308/DIG. 8; 428/643, 428/644, 645, 646, 647, 653, 687

[56] References Cited

U.S. PATENT DOCUMENTS

| 2,459,172 | 1/1949 | Luetkemeyer et al. | 428/643 |
| 2,635,020 | 4/1953 | Beebe | 308/237 |
| 2,741,018 | 4/1956 | Schaefer | 428/643 |
| 2,887,766 | 5/1959 | Fike et al. | 308/DIG. 8 |
| 3,077,285 | 2/1963 | Budininkas | 308/DIG. 8 |
| 3,623,205 | 11/1971 | Scott | 428/643 |
| 3,658,488 | 4/1972 | Brown et al. | 428/643 |
| 3,950,141 | 4/1976 | Roemer | 428/643 |
| 4,189,525 | 2/1980 | Mori | 428/643 |
| 4,206,268 | 6/1980 | Roemer et al. | 428/643 |
| 4,363,844 | 12/1982 | Hodes et al. | 428/643 |

FOREIGN PATENT DOCUMENTS

| 1161434 | 1/1964 | Fed. Rep. of Germany ... 308/DIG. 8 |
| 2638465 | 4/1977 | Fed. Rep. of Germany ... 308/DIG. 8 |
| 706672 | 3/1954 | United Kingdom . |
| 2034417A | 6/1980 | United Kingdom ......... 308/DIG. 8 |

Primary Examiner—L. Dewayne Rutledge
Assistant Examiner—John J. Zimmerman
Attorney, Agent, or Firm—Karl F. Ross; Herbert Dubno

[57] ABSTRACT

The bearing is composed of a strong metallic backing, a softer metallic support layer, and a galvanically applied metallic anti-friction layer, the support layer and the anti-friction layer being of mutually different metals or metallic alloys. An intermediate layer is provided between the support layer and the anti-friction layer. The intermediate layer is made as a layer which prevents or limits diffusion of metallic components from the anti-friction layer into the supporting layer and vice versa, and is composed of a binding layer, entering into a lasting surface bond with the material of the anti-friction layer, and of an underlayer, entering into a lasting surface bond with the material of the support layer.

6 Claims, 3 Drawing Figures

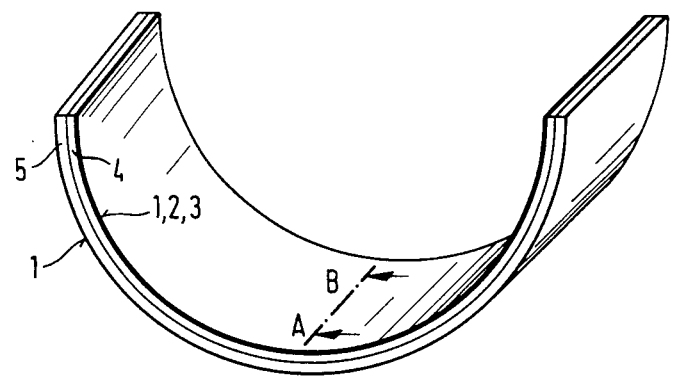
Fig. 1
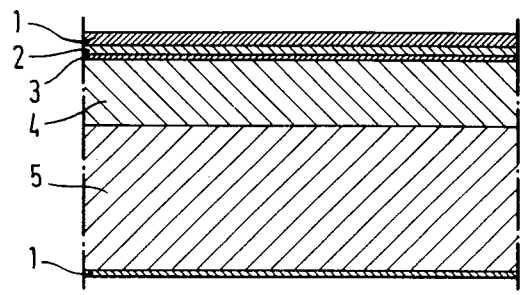
Fig. 2 (A-B)
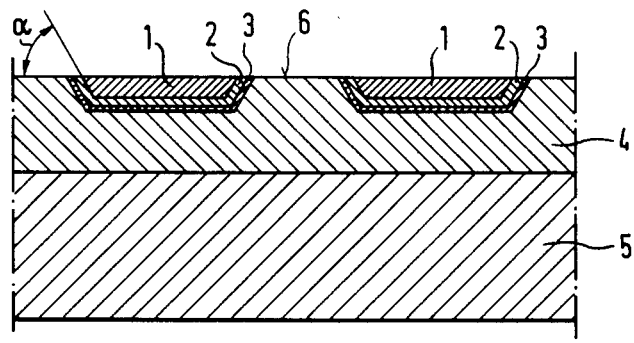
Fig. 3

MULTI-LAYER PLAIN BEARING

FIELD OF THE INVENTION

Our present invention relates to a multi-layer plain bearing composed of a strong metallic backing, a softer metallic support layer, and a galvanically applied metallic anti-friction layer, the support layer and the anti-friction layer being of mutually different metals or metallic alloys, an intermediate layer being provided between the support layer and the anti-friction layer.

BACKGROUND OF THE INVENTION

An attempt is known from German Pat. No. 844507 to provide a maximum 1.2 um thick layer of copper as a softer intermediate layer which however ensures sufficient bonding strength.

It has been found, that this copper layer is initially suitable to provide a sufficient bond between the support layer of an aluminum bearing material and the binding layer proper.

During thermal loading of the bearing, particularly in internal combustion engines, tin migrates from the anti-friction layer, which consists of PbSnCu or PbSn, into this intermediate layer of copper and forms there brittle intermetallic phases of copper/tin.

Under dynamic loading these intermetallic phases cause after a short time separation of the intermediate layer from the aluminum bearing material and therefore also the galvanically applied anti-friction layer, so that the bearing does not meet the demands placed on it. In addition, due to the migration of tin from the galvanically applied anti-friction layer of PbSnCu or PbSn, there is a considerable reduction in the corrosion resistance of the anti-friction layer.

It is known from U.S. Pat. No. 2,635,020 to provide an intermediate layer of CuZn (brass) in plain bearings with backings of steel, a support layer of bronze and a galvanically applied anti-friction layer of tin-containing alloys. It was found however, that this intermediate layer of brass prevents migration of tin from the anti-friction layer only to a relatively small degree. The same applies also to intermediate layers of brass between support layers of aluminum bearing metal and galvanically applied tin-containing anti-friction layers.

OBJECT OF THE INVENTION

The object of the invention is to provide a multi-layer plain bearing of the initially-mentioned kind in which the intermediate layer, situated between the support layer and the anti-friction layer, has significantly better bonding properties both with regard to the support layer and the antifriction layer - compared to intermediate layers of copper or copper/zinc - while acting as a good diffusion barrier for metallic components of the support layer and the anti-friction layer, and in which the abrasiveness of the intermediate layer to avoid seizure of the structural element mounted in the bearing when the anti-friction layer is partly worn off is adaptable to the abrasiveness of the anti-friction layer and the support layer.

SUMMARY OF THE INVENTION

This object is achieved according to the invention in that the intermediate layer is made as a layer which prevents or limits diffusion of metallic components from the anti-friction layer into the supporting layer and vice versa, and which is composed of a binding layer, entering into a lasting surface bond with the material of the anti-friction layer, and of an underlayer entering into a lasting surface bond with the material of the support layer.

This double-layer construction of the intermediate layer not only enables selection of the materials for the binding layer and the underlayer with regard to the optimum bond with the support layer and the anti-friction layer, but it also avoids in operation worsening of the bonding properties, due to diffusion of metallic components of the antifriction and/or the support layer into the intermediate layer, and also prevents the sliding properties and corrosion resistance, particularly of the anti-friction layer, from being adversely influenced.

It was found particularly surprising that after the anti-friction layer has been worn the binding layer and underlayer on the exposed areas are no longer detectable on the bearing surface or they are not transferred in a thin coating on the support layer. This can probably be explained in that the binding layer and the underlayer react chemically with the additives of the lubricant.

The underlayer may be galvanically applied on the surface of the support layer, the binding layer may be galvanically applied on the underlayer, and the anti-friction layer may be galvanically applied on the surface of the binding layer proper.

For instance, when the support layer is of a bearing alloy having at least emergency running properties, e.g. an aluminum alloy, and the antifriction layer is of a tin-containing alloy on lead basis, the binding layer may be of a tin-containing copper alloy and the underlayer may be of zinc and/or tin. The binding layer may be of an alloy containing 30 to 70% by weight of tin, the rest being mostly copper, and may be of a thickness of about 0.001 to about 0.015 mm, preferably between about 0.001 to 0.004 mm. An underlayer of zinc and/or tin may have a thickness $\leq 0.0015$ mm.

The invention was surprisingly found to be particularly advantageous in connection with groove bearings. In such groove bearings the anti-friction layer is inserted in the support layer in the form of strips extending substantially in the peripheral direction, e.g. helical strips. According to the invention, within the support layer a binding layer is situated below the anti-friction layer, which is inserted in the support layer in the form of a strip or strips, and an underlayer is located below the binding layer.

Preferably in such a groove bearing the binding layer and the underlayer extend at the edges of the anti-friction layer, which is inserted in the form of a strip or strips in the support layer, up to the sliding surface of the bearing. As a consequence even lateral covering of the strip-shaped anti-friction layer bonded to the support layer is obtained and in addition the material of the binding layer and the material of the underlayer are available in the sliding surface of the bearing. It has been found, surprisingly, that as a consequence the material of the binding layer and possibly also the material of the underlayer are, in operation of the plain bearing, distributed on the surface of the support layer which lies in the sliding surface of the bearing. In addition to the basic advantages of the design as a groove bearing, such as increased loadability, also the sliding properties are significantly improved.

If the materials of the binding layer and of the underlayer are to be active in the sliding surface of the bearing it is advisable to form the side edges of the anti-friction layer, which is inserted in the form of a strip or strips in the support layer, such that they converge in the direction of the depth of the support layer. Due to this the binding layer and the underlayer are obliquely embedded in the sliding surface of the bearing and, while providing an increased accession surface, offer more of its material in the sliding surface of the bearing. Preferred are angles of inclination of the lateral edges of the anti-friction layer e.g. between 45° and 75°.

BRIEF DESCRIPTION OF THE DRAWING

The invention will now be explained, by way of example, with reference to the accompanying drawing, in which:

FIG. 1 is a perspective illustration of a half-liner of a multi-layer plain bearing according to the invention.

FIG. 2 is an enlarged partial section along line A-B of FIG. 1, and

FIG. 3 is a partial section, corresponding to FIG. 2 of a groove bearing according to the invention.

SPECIFIC DESCRIPTION

The embodiment of the multi-layer plain bearing shown in FIGS. 1 and 2 has a metallic backing 5 of steel, a softer metallic support layer 4 of aluminum bearing metal and an anti-friction layer 1 of an alloy, e.g. PbSn10Cu2 or a lead-tin alloy. Between the support layer 4 and the anti-friction layer 1 is an intermediate layer 2,3 which consists of a binding layer 2 and an underlayer 3. The binding layer 2 is of an alloy containing more than 30% by weight of tin. Its thickness is between about 0.001 and about 0.015 mm. In the embodiment according to FIG. 1, the underlayer 3 is of tin and its thickness is about 0.001 mm.

To begin manufacture of the plain bearing a strip of aluminum bearing metal is plated onto a steel strip. From blanks made of this bi-metal material a plain bearing half-liner shown in FIG. 1 is formed. After such formation the underlayer 3 is galvanically deposited on the surface of the support layer 4 of aluminum bearing metal. On the underlayer 3 is galvanically deposited the binding layer 2. Finally an anti-friction layer 1 is galvanically deposited on the binding layer 2.

It has been found by experiments with such plain bearings that the CuSn binding layer 2 between the aluminum bearing metal, which is plated on steel, and the anti-friction layer 1, which is of an alloy, e.g. PbSnCu or PbSn, no separation or failure were visible when the proportion of tin in the CuSn binding layer was greater than 30% by weight. The diffusion of the tin migrating from the galvanically deposited anti-friction layer 1 is negligibly small.

It has also surprisingly been found in exhaustive experiments with insufficient lubrication that even when the galvanically deposited anti-friction layer 1 of PbSnCu or PbSn situated between the binding layer of CuSn and the metallic material of the shaft had been worn off no seizure occurred. In contrast to that in experiments under identical conditions with plain bearings on the basis steel/aluminum-bearing metal/nickel-intermediate layer/galvanically deposited anti-friction layer of PbSnCu or PbSn failures (seizure) were observed in experimental runs when the anti-friction layer was worn.

It was found from a series of experiments that the above-mentioned advantages of the binding layer proper 2 were obtained only when, between the support layer 4, particularly a support layer of aluminum bearing metal, and the binding layer 2, an underlayer 3 was applied of tin or zinc of a thickness of approximately ≦1.5 um.

FIG. 3 shows a plain bearing which can be heavily loaded and is in the form of a groove bearing in which the anti-friction layer 1 is in the form of a strip or strips inserted in the support layer 4 in regions extending substantially in the peripheral direction, e.g. helically arranged regions.

As is apparent from the drawings, a binding layer within the support layer 4 is beneath the anti-friction layer 1. Within the support layer 4 is also, an underlayer 3 is disposed below the binding layer 2. The lateral faces of the anti-friction layer 1, which is inserted in the form of a strip or strips in the support layer 4, converge in the direction of the depth of the support layer 4 at an angle of inclination, which is, in the illustrated example about 60°. The binding layer 2 and the underlayer 3 extend at the lateral edges of the antifriction layer 1 up to the sliding surface 6 of the bearing. Due to this the sliding surface 6 of the bearing is formed partly by the surface of the support layer 4 and partly by the surface of the anti-friction layer 1 and also partly by the obliquely cut cross-sectional areas of the binding layer 2 and the underlayer 3. The material of the binding layer 2 and the material of the underlayer 3 are, in the operation of the plain bearing, distributed over the entire sliding surface 6 of the bearing and form, in co-operation with additives contained in the lubricant, a thin coating, covering the whole sliding surface 6 of the bearing, which significantly improves the sliding properties, particularly in the surface regions of the support layer 4.

As in the example shown in FIGS. 1 and 2, the backing 5 in FIG. 3 may be of steel. The support layer 4 may be of aluminum bearing metal and the anti-friction layer 1 of tin-containing bearing alloy, e.g. PbSnCu or PbSn. The materials and thicknesses of the binding layer 2 and the underlayer 3 may be substantially the same as those in the example shown in FIGS. 1 and 2.

We claim:

1. A multi-layer plain bearing composed of a strong metallic backing, a softer metallic support layer, and a galvanically applied material antifriction layer, the support layer and the antifriction layer being of mutually different metals or metallic alloys, an intermediate layer being provided between the support layer and the anti-friction layer, wherein the intermediate layer is made as a layer which prevents or limits diffusion of metallic components from the antifriction layer into the support layer and vice versa, and which is composed of a binding layer entering into a lasting surface bond with the material of the antifriction layer,. and of an underlayer entering into a lasting surface bond with the material of the support layer, the support layer being of a bearing alloy having at least emergency running properties, the antifriction layer being of a tin-containing alloy on lead basis, the binding layer being of an alloy consisting substantially of copper and tin, and the underlayer being of a material selected from the group consisting of zinc, tin, and an alloy containing zinc and tin.

2. A multi-layer plain bearing according to claim 1, wherein the underlayer is of a thickness ≦0.0015 mm.

3. A multi-layer plain bearing according to claim 1, wherein the anti-friction layer is inserted in a groove in strip form in the support layer, and within the support layer, the binding layer is located below the anti-friction layer, and the underlayer is located below the binding layer.

4. A multi-layer plain bearing according to claim 3, wherein the binding layer and the underlayer extend at the edges of the anti-friction layer up to a sliding surface of the bearing.

5. A multi-layer plain bearing according to claim 4, wherein side faces of the anti-friction layer converge in the direction of the depth of the support layer at an angle.

6. A multi-layer plain bearing composed of a strong metallic backing, a softer metallic support layer, and a galvanically applied metallic antifriction layer, the support layer and the antifriction layer being of mutually different metals or metallic alloys, an intermediate layer being provided between the support layer and the antifriction layer, wherein the intermediate layer is made as a layer which prevents or limits diffusion of metallic components from the antifriction layer into the support layer and vice versa, and which is composed of a binding layer entering into a lasting surface bond with the material of the antifriction layer, and of an underlayer entering into a lasting surface bond with the material of the support layer, the support layer being of a bearing alloy having at least emergency running properties, the antifriction layer being of a tin-containing alloy on lead basis, the binding layer being of an alloy consisting substantially of copper and tin, and the underlayer being of a material selected from the group consisting of zinc, tin, and an alloy containing zinc and tin, the binding layer being of an alloy containing 30 to 70% by weight of tin, the rest being mostly copper, and its thickness being between 0.001 and 0.015 mm.

* * * * *